(12) United States Patent
Arimilli et al.

(10) Patent No.: US 6,904,490 B2
(45) Date of Patent: *Jun. 7, 2005

(54) METHOD AND SYSTEM OF MANAGING VIRTUALIZED PHYSICAL MEMORY IN A MULTI-PROCESSOR SYSTEM

(75) Inventors: Ravi Kumar Arimilli, Austin, TX (US); John Steven Dodson, Pflugerville, TX (US); Sanjeev Ghai, Round Rock, TX (US); Kenneth Lee Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 239 days.

This patent is subject to a terminal disclaimer.

(21) Appl. No.: 10/268,743

(22) Filed: Oct. 10, 2002

(65) Prior Publication Data

US 2004/0073743 A1 Apr. 15, 2004

(51) Int. Cl.[7] .............................................. G06F 12/00
(52) U.S. Cl. .............................. 711/5; 711/4; 711/114; 711/161; 711/162; 711/200; 711/203; 711/209
(58) Field of Search ................................ 711/4–5, 114, 711/161–162, 200, 203, 209

(56) References Cited

U.S. PATENT DOCUMENTS

| | | | | |
|---|---|---|---|---|
| 5,404,479 A | * | 4/1995 | Yamamoto ................... | 711/112 |
| 5,615,352 A | * | 3/1997 | Jacobson et al. ............ | 711/114 |
| 5,819,310 A | * | 10/1998 | Vishlitzky et al. .......... | 711/114 |
| 5,926,836 A | * | 7/1999 | Blumenau .................... | 711/162 |
| 6,044,445 A | * | 3/2000 | Tsuda et al. ................. | 711/163 |
| 6,141,729 A | * | 10/2000 | Ishida et al. ................. | 711/114 |
| 6,223,269 B1 | * | 4/2001 | Blumenau .................... | 711/202 |
| 6,243,790 B1 | * | 6/2001 | Yorimitsu .................... | 711/112 |
| 6,269,431 B1 | * | 7/2001 | Dunham ...................... | 711/162 |
| 6,282,610 B1 | * | 8/2001 | Bergsten ...................... | 711/114 |
| 6,341,341 B1 | * | 1/2002 | Grummon et al. ........... | 711/162 |
| 6,356,991 B1 | * | 3/2002 | Bauman et al. .............. | 711/209 |
| 6,434,681 B1 | * | 8/2002 | Armangau .................... | 711/162 |
| 6,442,649 B1 | * | 8/2002 | Anderson ..................... | 711/114 |
| 6,442,650 B1 | * | 8/2002 | Bachmat et al. ............. | 711/114 |
| 6,457,139 B1 | * | 9/2002 | D'Errico et al. ................ | 714/5 |
| 6,473,847 B1 | * | 10/2002 | Kamiya ....................... | 711/171 |
| 6,662,289 B1 | * | 12/2003 | Ang ............................. | 711/202 |
| 6,665,787 B2 | * | 12/2003 | Franaszek et al. ........... | 711/206 |

\* cited by examiner

Primary Examiner—Matthew Anderson
Assistant Examiner—Zhuo H. Li
(74) Attorney, Agent, or Firm—Casimer K. Salys; Dillon & Yudell LLP

(57) ABSTRACT

A processor contains a move engine and mapping engine that transparently reconfigure physical memory to accomplish addition, subtraction, or replacement of a memory module. A mapping engine register stores FROM and TO real addresses that enable the engines to virtualize the physical address of the memory module being reconfigured and provide the reconfiguration in real-time through the use of hardware functionality and not software. Using the FROM and TO real addresses to select a source and a target, the move engine copies the contents of the memory module to be removed or reconfigured into the remaining or inserted memory module. Then, the real address associated with the reconfigured memory module is re-assigned to the memory module receiving the copied contents, thereby creating a virtualized physical mapping from the addressable real address space being utilized by the operating system into a virtual physical address space. During the process of moving the memory contents, the mapping engine maps Write memory requests addressed to the real address space currently associated with the reconfigured memory module to both the FROM and TO real address space. As will be appreciated, a memory module can be inserted, removed or replaced in physical memory without the operating system having to direct and control the reconfiguration of physical memory to accomplish the physical memory change.

17 Claims, 4 Drawing Sheets

METHOD AND SYSTEM OF MANAGING VIRTUALIZED PHYSICAL MEMORY IN A MULTI-PROCESSOR SYSTEM

RELATED APPLICATIONS

The present invention is related to the subject matter of the following commonly assigned, copending United States patent applications: Ser. No. 10/268,728 entitled "Method and System of Managing Virtualized Physical Memory in a Memory Controller and Processor System" and filed Oct. 10, 2002; Ser. No. 10/268,741 entitled "Method and System of Managing Virtualized Physical Memory in a Data Processing System" and filed Oct. 10, 2001. The content of the above-referenced applications is incorporated herein by reference.

BACKGROUND OF THE INVENTION

1. Technical Field

The present invention relates in general to data processing and in particular to managing physical memory in a data processing system. Still more particularly, the present invention relates to a method and system for managing physical memory in a data processing system autonomously from operating system control.

2. Description of the Related Art

In computer systems it is customary that there be one-to-one correspondence between the memory address produced by the processor and a specific area in the physical memory of the system. This limits the operating system and applications to an address space determined by the actual physical memory installed in the system. Moreover, many modem computer systems run multiple concurrent tasks or processes, each with its own address space. It would be expensive to dedicate a full complement of memory to each task and the operating system, especially since many processes use only a small part of their address spaces at any given time. Modern computer systems have overcome this limitation through the use of virtual memory, which implements a translation table to map program addresses (or virtual addresses) to real memory addresses. Virtual memory allows a program to run on what appears to be a large, contiguous, physical-memory address space, dedicated entirely to the program. In reality, however, the available physical memory in a virtual memory system is shared between multiple programs or processes. Virtual addresses used in a process are translated by a combination of computer hardware and software to real addresses of physical memory. This process is called memory mapping or address translation.

In a virtual memory system, the allocation of memory is most commonly performed by the operating system software (OS). It is a function of the operating system to ensure that the data and code a program is currently using is in main memory and that the translation table can map the virtual addresses to the real addresses correctly. This requires an interrupt of the instruction sequence so that the privileged kernel code can allocate physical memory to the area being accessed so that normal program flow can continue without error. This interrupt and the kernel processing to allocate physical memory requires a significant amount of processing time and upsets the normal pipelining of instructions through the CPU.

The burden on the operating system of managing physical memory increases when the physical memory is reconfigured while the computer system is in operation. In cases where the physical memory size is increased or decreased, or when a memory module is replaced during system operation (for example, when a failure occurs in a memory module requiring replacement), the OS is required to temporarily interrupt the task being processed, modify the system memory configuration information in the translation table, and use the changed physical addresses to store data from the bad memory device out to disk, and then reconfigure the remaining memory devices. If a memory device has been removed, the OS must invalidate the physical address space of the removed device and maintain the invalidated address space so that it can not be used, essentially leaving an unavailable block of space within the addressable space of the memory system. The operating system must then map logical addresses to physical addresses to avoid pages with bad memory locations. These problems increase the overhead of the OS and complicate the control of memory. What is needed is a method and system for physical memory control capable of solving the above-described problems of the prior art and quickly and efficiently implementing dynamic reconfiguration of physical memory as required.

SUMMARY OF THE INVENTION

In accordance with a preferred embodiment, a method and system of managing virtualized physical memory in a multiprocessor system is provided. A multiprocessor system is coupled to a physical memory system having a plurality of memory modules for storing data as a plurality of memory blocks, each memory block comprising contiguous bytes of physical memory, and further coupled to at least one memory controller, wherein each memory controller of the at least one memory controller has one or more memory modules of the plurality of memory modules coupled thereto, and wherein each memory controller of the at least one memory controller responds to memory accesses by writing and reading memory blocks stored within one or more of the memory modules coupled thereto. The multiprocessor system includes at least one processor device for generating memory accesses containing real addresses associated with memory locations of the physical memory system for reading and writing of data thereto. A register within a processor device has a first field storing a FROM real address corresponding to a first memory module of the plurality of memory modules coupled thereto, wherein a first memory controller coupled to the first memory module is programmed to respond to memory requests addressed to the FROM real address, and a second field storing a TO real address corresponding to a second memory module of the plurality of memory modules coupled thereto, wherein a second memory controller coupled to the second memory module is programmed to respond to memory requests addressed to the TO real address. A move engine within the processor device is provided that, in response to a notification that a configuration of the first and second memory modules is being modified, copies the plurality of memory blocks from the first memory module to the second memory module based on the FROM real address and the TO real address. A mapping engine within the processor device issues a write memory request addressed to the FROM real address and the TO real address in response to the processor device issuing a write memory request addressed to the real address stored in one of the first field or second field during a time period that the move engine is copying the plurality of memory blocks from the first memory module to the second memory module, and that reprograms the second memory controller to respond to memory requests addressed to the FROM real address after the time period that the move engine is copying the plurality of memory blocks from the first memory module to the second memory module.

In an alternative embodiment, the mapping engine issues the write memory request addressed to both the FROM real address and TO real address in response to the processor device requesting a write memory request addressed to the FROM real address during a time period that the move engine is copying the plurality of memory blocks from the first memory module to the second memory module.

In another alternative embodiment, the first memory module is removed from the physical memory system after the mapping engine enables the second memory controller to respond to memory accesses addressed to the FROM real address after the time period that the move engine is copying the plurality of memory blocks from the first memory module to the second memory module.

In yet another alternative embodiment, the FROM real address is within the current addressable space of the physical memory system prior to the time period that the move engine is copying the plurality of memory blocks from the first memory module to the second memory module.

In yet another alternative embodiment, the second memory module is inserted into the physical memory system before the move engine copies the plurality of memory blocks from the first memory module to the second memory module.

In yet another alternative embodiment, the FROM real address is outside the current addressable space of the physical memory system address prior to the time period that the move engine is copying the plurality of memory blocks from the first memory module to the second memory module.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
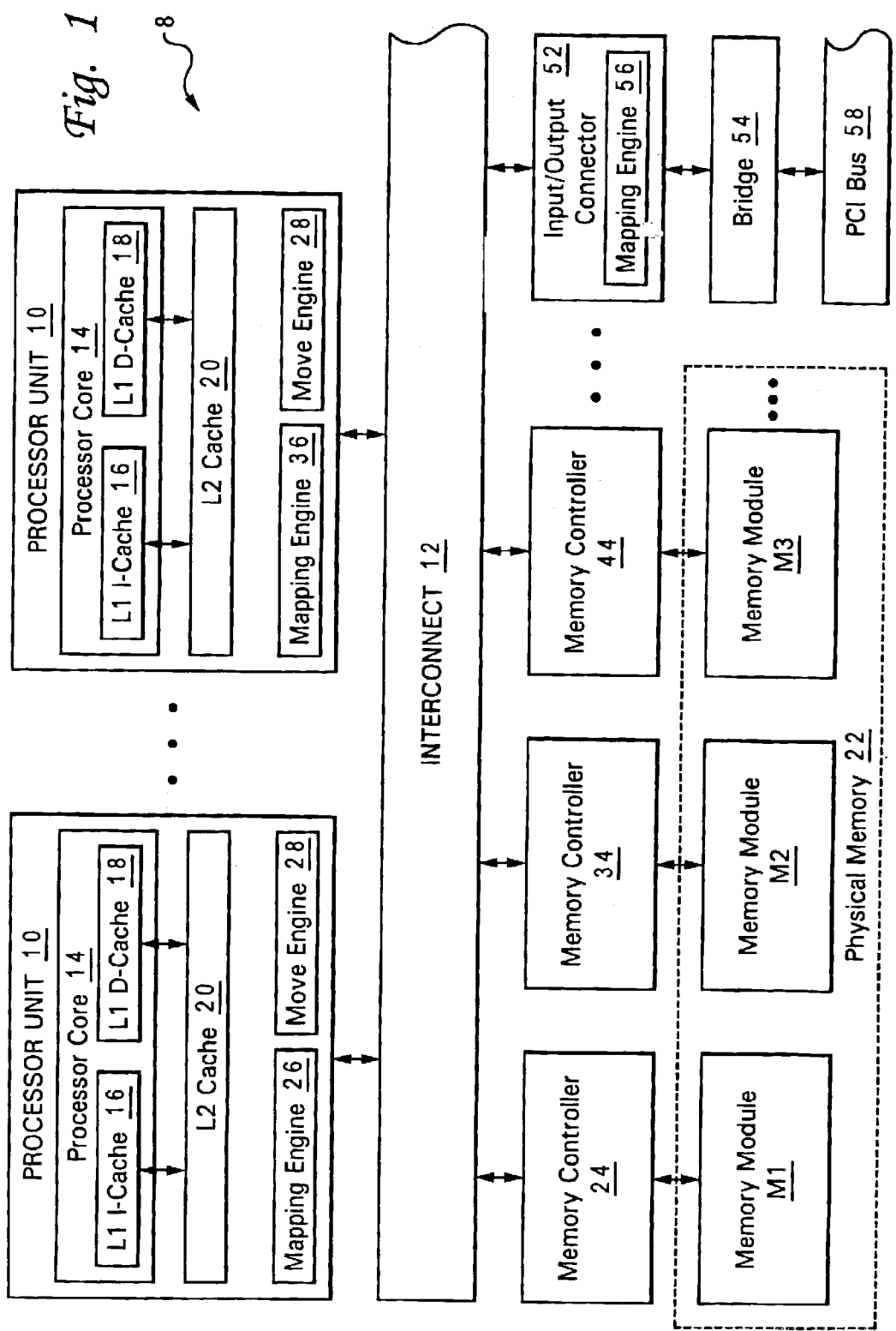
FIG. 1 depicts a data processing system implemented in accordance with a preferred embodiment of the present invention.

With reference now to the figures and in particular with reference to FIG. 1, there is illustrated a high-level block diagram of a multiprocessor (MP) data processing system that supports memory management of virtualized physical memory, in accordance with one embodiment of the present invention. As depicted, data processing system 8 includes a number (e.g., 64) of processing units 10 coupled for communication by a system interconnect 12. Each processing unit 10 is an integrated circuit including one or more processor cores 14. In addition to the registers, instruction flow logic and execution units utilized to execute program instructions, each of processor cores 14 includes associated level one (L1) instruction and data caches 16 and 18, which temporarily buffer instructions and operand data, respectively, that are likely to be accessed by the associated processor core 14.

As further illustrated in FIG. 1, the memory hierarchy of data processing system 8 also includes the physical memory 22, comprising one or more memory modules (shown as memory modules M1, M2 and M3), which form the lowest level of volatile data storage in the memory hierarchy, and one or more lower levels of cache memory, such as on-chip level two (L2) caches 20, which are utilized to stage instructions and operand data from physical memory 22 to processor cores 14. As understood by those skilled in the art, each succeeding lower level of the memory hierarchy is typically capable of storing a larger amount of data than higher levels, but at higher access latency. As shown, physical memory 22, which is interfaced to interconnect 12 by memory controllers 24, 34 and 44, may store operand data and portions of or more operating systems and one or more application programs. Memory controllers 24, 34 and 44 are coupled to and control corresponding memory modules M1, M2 and M3, respectively (although shown only coupled to a single memory module each, it should be understood that each memory controller can control a plurality of memory modules of memory system 22). A set comprising all or part of the memory modules M1, M2 and M3 constitutes a set of physical memory resources for the operating system and applications of the machine.

System interconnect 12, which can comprise one or more buses, a switch fabric, or other interconnect architecture, serves as a conduit for communication among the devices (e.g., processing units 10, memory controllers 24, 34 and 44, etc.) coupled to system interconnect 12. A typical transaction on system interconnect 12 begins with a request, which may include a transaction field indicating the type of transaction, one or more tags indicating the source and/or intended recipient(s) of the transaction, and an address and/or data. Each device connected to system interconnect 12 preferably snoops all transactions on system interconnect 12 and, if appropriate, responds to the request with a snoop response. These actions may include sourcing data on system interconnect 12, storing data provided by the requesting snooper, invalidating cached data, etc. Input/output connector 52 is also coupled to interconnect 12 and provides a conduit for communications among the other devices coupled to interconnect 12 and the external devices coupled to PCI bus 58 through bridge 54.

Data processing system 8 utilizes a virtual memory system, which implements a translation table to map program addresses (or effective addresses) to real memory addresses. The virtual memory system allows the available physical memory to be shared between multiple programs or processes. Processing units 10 allow the address space of the processing units ("logical address space") to have a different size than the available physical memory 22 by providing an address translation mechanism that translates the effective addresses (EA) to physical addresses (PA) that refer to locations in actual physical memory. This virtual memory system also allow multiple programs to reside simultaneously in system memory without each needing to know the location of its physical base address. Rather, such multiple programs need only know their logical base address. Moreover, rather than attempting to maintain a translation or mapping for each possible effective address, the virtual memory system divides effective and physical memory into blocks. In many systems, these blocks are fixed in size and referred to as sections or pages. The addresses within an individual page all have identical upper-most bits. Thus, a memory address is the concatenation of a page number, corresponding to the upper bits of the address, and a page offset, corresponding to the lower bits of the address.

Data structures are typically maintained in physical memory to translate from effective page numbers to real page addresses. These data structures often take the form of conversion tables, normally referred to as segment tables and page tables. A segment table is indexed by an effective page address or number, and generally has a number of entries corresponding to pages in the effective address space. Each entry is a mapping of a specific page number or effective page address to a virtual page address. A page table is indexed by a virtual page address or number, and generally has a number of entries corresponding to pages in the virtual address space. Each entry is a mapping of a specific page number or virtual page address to a real page address.

Effective-to-real address translation is performed in processor units 10 using a specialized hardware cache (not shown), referred to as an address translation cache or as a translation lookaside buffer (TLB), dedicated to translations. A TLB is a fast and small static memory for storing the most frequently referenced entries from the page table. It typically has a fixed number of entries. When processing a memory request, a computer first attempts to find an appropriate address translation in the TLB. If such an address translation is not found, a page table is automatically accessed to retrieve the proper translation.

Those skilled in the art will appreciate that data processing system 8 can include many additional unillustrated components, such as I/O adapters, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of any architecture and are in no way limited to the generalized MP architecture illustrated in FIG. 1.

Figure 2:
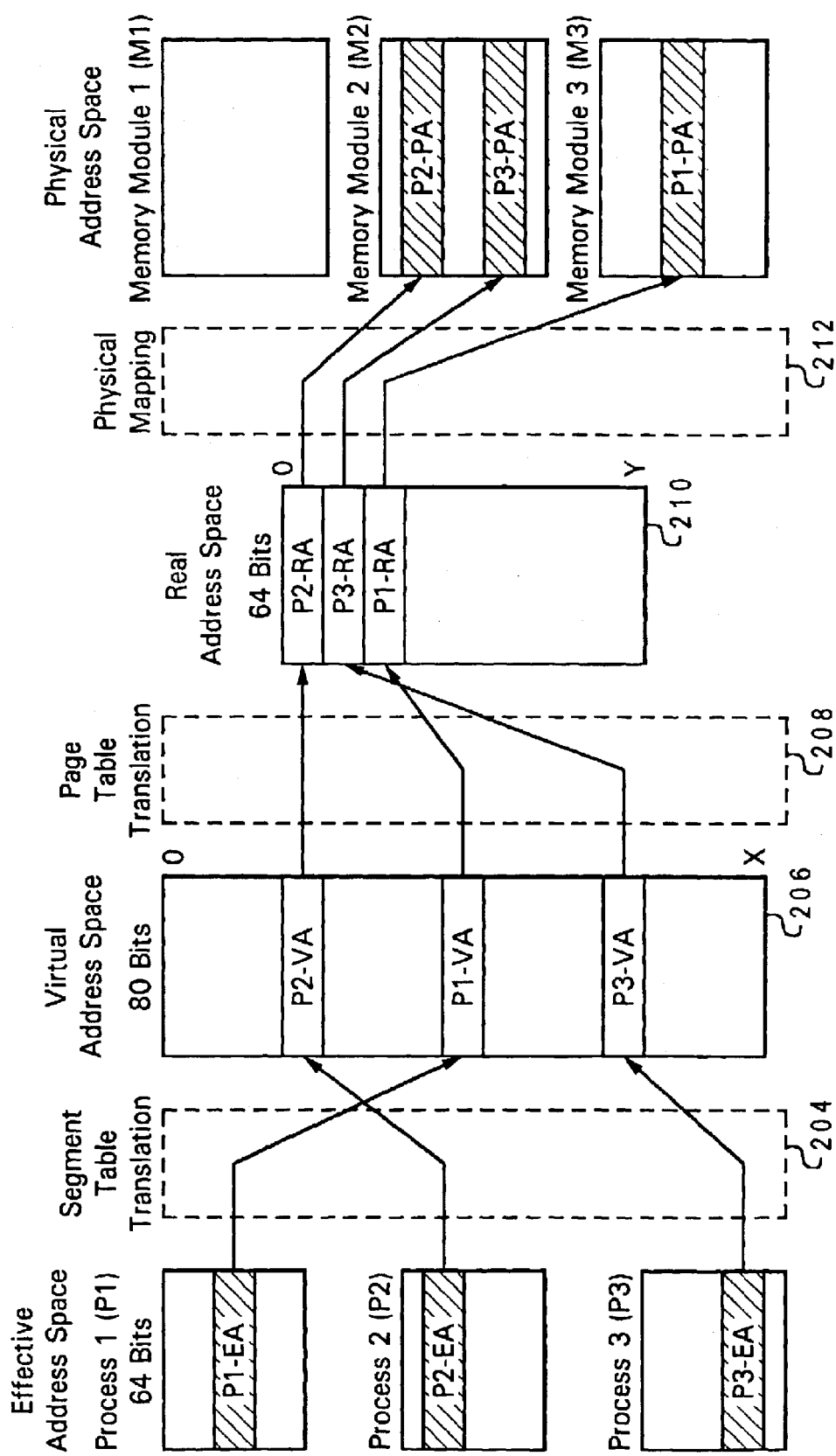
FIG. 2 shows a block diagram representation of the memory address translation process for the memory system of the data processing system shown in FIG. 1, in accordance with a preferred embodiment of the present invention.

With reference now to FIG. 2, there is shown a depiction of the memory mapping function performed by the memory management system for the virtual memory system of data processing system 8, in accordance with a preferred embodiment of the present invention. The Application Address Space represents the address space in which the plurality of processes operating on processor units 10 operate independently of each other. Shown are three processes, Process 1 (P1), Process 2 (P2), and Process 3 (P3), each with their own logical address spaces. For each process, a page or block in its addressable space is addressed by an effective address. As shown in FIG. 2, effective addresses within the Application Address Space of the currently loaded pages in the Physical Address Space are shown as P1-EA, P2-EA, and P3-EA, respectively, for the three executing processes. Each effective address is a 64-bit address that is translated by the Segment Table Translation 204. The Segment Table Translation 204 is performed by a segment look-aside buffer (SLB) or segment look-aside registers (SLR) within processor core 14. Each addressable space within the application address spaces P1, P2, and P3 is translated by the SLB or SLR into 80-bit virtual addresses within Virtual Address Space 206. Thus, P1-EA, P2-EA, and P3-EA are translated by the Segment Table Translation into P2-VA, P1-VA, and P3-VA, respectively. Using the translation look-aside buffer (TLB) within processor core 14, each virtual address space P1-VA, P2-VA, and P3-VA is then translated by Page Table Translation 208 into Real Address Space 210 such that each of the 80-bit virtual is addresses P1-VA, P2-VA, and P3-VA are translated into their 64-bit real addresses P1-RA, P2-RA, and P3-RA, representing the real addresses within the system memory. A real address RA is normally constituted by two fields, a field that codes a physical page number into a number "i" of bits, for example high-order bits, and a field that codes a shift from the start of a physical page into a number "j" of bits, for example low-order bits. The power of two of the number j indicates the size of a page, for example a number j equal to twelve indicates a page size of four kilobytes. The power of two of the number i indicates the physical memory size in numbers of pages, for example a number i equal to twenty indicates a number of one physical megapage, or four gigabytes of physical memory.

As shown in FIG. 1, memory controllers 24, 34, and 44 perform a physical mapping of the real address to access the requested pages in memory modules M1, M2 and M3. So, if the addressed pages in the Real Address Space 210 are not found in the L1 caches 16, 18, and L2 cache 20, a memory access is requested over interconnect 12. Upon detecting a memory access request in the interconnect 12, each memory controller 24, 34, 44 checks the real address space addressed by the memory access. The high-order bits of the real address from the processor unit 10 are decoded by memory controllers 24, 34 and 44, which identifies the addressable real space of each memory controller's corresponding memory module M1, M2, M3. Each memory controller 24, 34 and 44 responds to memory accesses addressed to its corresponding memory module.

As seen in FIG. 2, physical mapping 212 is thus performed by memory controllers 24, 34 and 44. Physical mapping 212 translates the real addresses for the address pages P1-RA, P2-RA, and P3-RA and maps them into the corresponding physical addresses, P1-PA, P2-PA, and P3-PA, respectively, representing the physical addresses of those requested pages within the corresponding memory modules M1, M2 and M3. The physical address indicates the specific memory location within the memory module storing the addressed information. For example, P2-PA specifies the specific row and column addresses to uniquely identify the addressed page in memory module 2. This physical mapping mechanism is invisible to the operating system OS, which views all of the physical memory resources by means of their real addresses without a 15 priori distinguishing the locality of these resources to a particular memory module M1, M2, M3 within system memory 22.

Referring back to FIG. 1, a mapping engine 36 and move engine 28 are contained in each processor unit 10. Mapping engines 36 and move engines 28 provide the virtualization function of the physical memory to allow efficient re-configuration of the physical memory 22, in accordance with a preferred embodiment. When physical memory 22 is re-configured, such as when one of memory modules M1, M2 and M3 are inserted, removed or replaced in the system, move engine 28 performs a data transfer between the memory modules of physical memory 22, and mapping engine 36 controls the real addressing of the subject memory module of memory modules M1, M2, M3 to allow the addition, subtraction or substitution of the particular memory module. This memory management is done efficiently at the hardware/firmware level, requiring little operating system resources to accomplish the re-configuration of physical memory. In operation, each mapping engine 36 provides a configurable assignment of the real address space (specifically the high-order, real address bits) for a selected memory module that is being reconfigured, which effectively changes the base address of that memory device.

Figure 3:
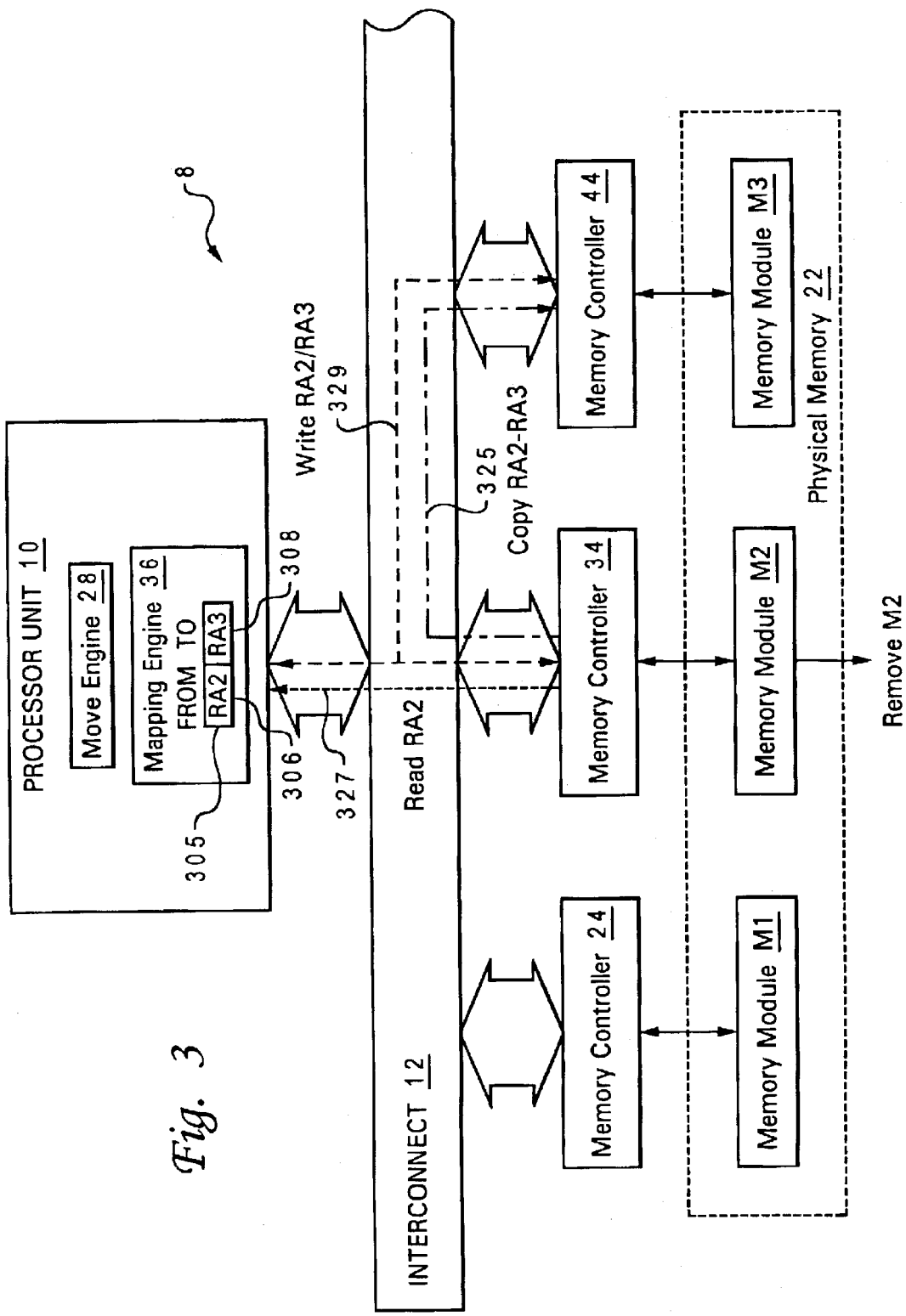
FIG. 3 shows a simplified diagram of the data processing system shown in FIG. 1 for the case where a memory module is being removed from physical memory system, in accordance with the preferred embodiment of the present invention.

FIG. 3 illustrates an embodiment where a memory module is being removed from physical memory in a simplified drawing of data processing system 8. As will be explained, the processor's move engine works in conjunction with the associated mapping engine to take the associated memory module off-line prior to its physical removal. Generally, the move engine copies the contents of the memory module to be removed into the remaining memory modules of physical memory. Then, the real address of the memory module is re-assigned to the memory module receiving the copied contents.

In this example, memory module M2 is being removed from data processing system 8. As a first step, processor unit 10 reports to the operating system that its total available physical memory has now been reduced by one memory module. For example, if each memory module M1, M2, M3 is a 64 Giga-Byte (GB) memory device, the operating system would be informed that its available physical memory is now 128 GB. The operating system immediately begins to swap out pages to reduce the amount of stored data accordingly. Processor unit 10 notifies all move engines 28 and mapping engines 36 that memory module M2 is being removed from physical memory 22. Move engines 28 immediately selects the remaining module or modules that will be used to store the data contained in memory module M2.

Each mapping engine 36 within processor units 10 contain a register 305 storing a "current" real address for the memory module being removed and a "new" real address for the memory module being removed (as used herein, the real address refers to the entire real address or that portion (for example, the higher-order bits) needed to uniquely identify an associated memory module storing data addressed by the indexed block of memory). Each processing unit 10 loads their respective register 305 as necessary to perform a given memory re-configuration.

As seen in FIG. 3, mapping engine 36 contains a register 305 having field 306 containing the FROM real address of memory module M2 and a field 308 containing the TO real address of the corresponding memory module retaining the memory contents of the removed module, in this case memory module M3. Register 305 contains field 306, showing the FROM real address of memory module M2 as RA2 and field 308 contains a TO real address for memory module M2, that is RA3.

In the example shown in FIG. 3, move engine 28 selects memory module M3 to receive the data stored in memory module M2. Memory module M1 remains on-line and does not receive any data from memory module M2. After loading the registers 305, move engine 28 begins a "move process" for copying the contents of the memory address space at the FROM real address (RA2) into the memory address space at the TO real address (RA3). Accordingly, move engine 28 begins copying the contents of memory module M2 into memory module M3 by making memory access requests over interconnect 12 to memory controller 34 to copy each memory cell of memory module M2 into the memory address space at real address RA3. Move engine 28 thereby copies all storage in memory module M2, addressed by real address RA2, into memory module M3, addressed by real address RA3, as is shown by path 325. In an alternative embodiment, move engine 28 copies a portion of memory module M2's content into memory module M3 and the remainder in other memory modules of memory system 22 (for example, memory module M1).

During the process of moving the memory storage, memory controllers 24, 34, and 44 continue to respond to memory access requests over interconnect 12. Mapping engines 36 enable their respective processors to issue memory requests such as "Reads" and "Writes" that are addressed to the memory stored at the current real address, as indicated by the FROM real address field 306, by providing a mapping to the physical addresses of memory modules M2 and/or M3 to execute such memory accesses directed to the current real address space, in accordance with a preferred embodiment. In the example of FIG. 3, memory module M2 would continue to respond to Reads addressed to real address RA2, as illustrated by path 327. In accordance with the preferred embodiment, mapping engines 36 would map Write requests to the current real address space from their associated processor to both the FROM real address and new real address, as indicated by the FROM and TO real address fields 306, 308, respectively. Accordingly, as illustrated by path 329 in FIG. 3, a Write to real address RA2 would be directed to both memory controllers 34 and 44 because memory module M2's FROM real address is RA2 (as shown in field 306) and its TO real address is RA3 (as shown in field 308). The memory system is assured to have coherency throughout the move process because memory writes to RA2 continue to be stored in both memory modules M2 and M3.

Upon completion of the data transfer from memory module M2 to memory module M3, move engine 28 updates registers 305 by copying the TO real address into the FROM real address fields 306, or by resetting mapping engines 36. Memory controller 44 is then reprogrammed to respond to real addresses RA2, previously managed by memory controller 34. Memory module M1 is now addressed by real address RA1 and memory module M3 is now addressed by real address RA2. Memory Controller 44 now performs a physical mapping of real addresses in the RA2 space directly into memory module M3, thereby creating a virtualized physical mapping from the addressable real address space being utilized by the operating system into a virtual physical address space.

Figure 4:
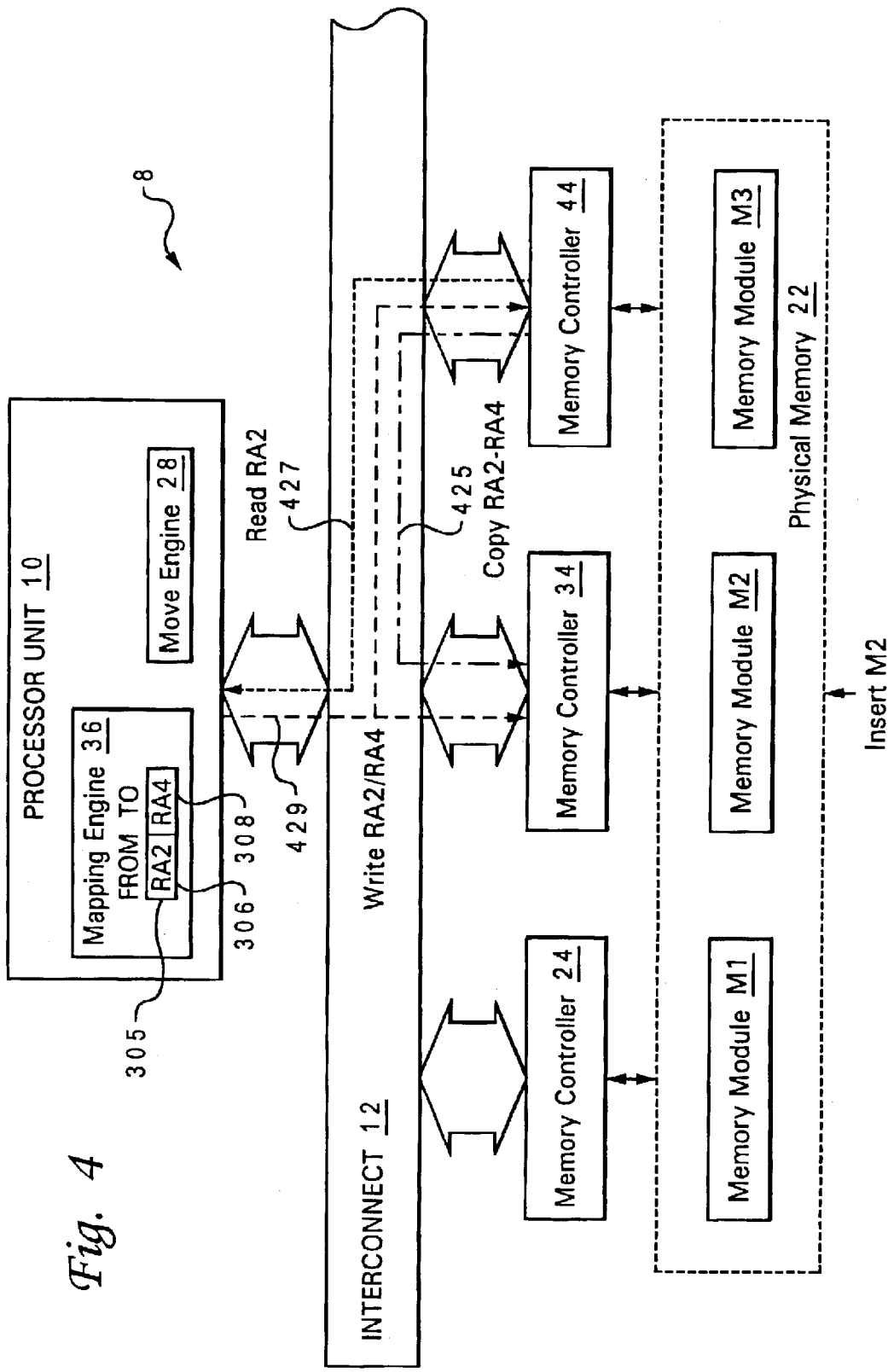
FIG. 4 shows a simplified diagram of the data processing system shown in FIG. 1 for the case where a memory module is being removed from physical memory system, in accordance with the preferred embodiment of the present invention.

With reference now to FIG. 4, there is shown a simplified block diagram of data processing system 8, which depicts a memory module M2 being inserted into physical memory 22. Each processor unit 10 notifies their respective move engine 28 and mapping engine 36 that a memory module is being added to physical memory 22 and will be inserted into a memory slot associated with and controlled by memory controller 34. At this point, the current real address space for data processing system 8 is comprised of the physical memory of memory modules M1 and M3 and is addressed by the real address space RA1-RA2.

Each register 305 within each processor unit 10 is programmed with respective current and new real addresses in accordance with a preferred embodiment. The TO real address assigned to memory module M2 is programmed with a real address, in this case RA4, outside the current real address space of physical memory 22. The FROM real address is the address that the memory module being inserted will be assigned to after insertion and reprogramming of the real addressable space. Field 306 is programmed with a FROM real address RA2 and field 308 is programmed with a TO real address RA4. The memory controller associated with the memory module being inserted, in this case memory controller 34, is programmed to respond to real address RA4. As will be appreciated, the real address selected for each field is dependent on the size of the memory module M2 being inserted and the size of the existing memory module M3. In this example, they are assumed to be of equal size. In the event that they are different sizes, the real address for memory module M3 would be selected to fall on the memory boundary of memory module M2 to provide a contiguous real memory space.

After memory module M2 is physically inserted into physical memory 22, and after loading the registers 305, move engine 28 begins a "move process" for copying the contents of the memory address space at FROM real address (RA2) into the memory address space at TO real address (RA4). Accordingly, move engine 28 begins copying the contents of memory module M3 into memory module M2 by making memory access requests over interconnect 12 to memory controller 44 to copy each memory cell of memory module M3 into the memory address space at real address RA4. Memory controller 44 receives writes from each memory cell of memory module M3 and maps them into the physical address space of memory module M2. This is depicted in FIG. 4 by path 425 showing a copy of memory cells at real address RA2 into the memory cells at real address RA4.

During the move process, mapping engines 36 is programmed to respond to memory accesses by processor unit 10 that are addressed to the FROM real address programmed into their registers 305 at field 306. As shown in FIG. 4, a Read memory access from processor unit 10 directed to real address RA2 continues to be serviced by the memory controllers 44, which is programmed to respond to real address space RA2. A Write memory access from processor unit 10 directed to real address RA2 will cause mapping engine 36 to issue Write memory requests to both memory controllers (in this case memory controllers 34 and 44), which respond to memory accesses to the FROM and TO real address in registers 305, respectively. These memory controllers will write the received data into their coupled memory modules by physically mapping into the corresponding row and column physical address. As shown in FIG. 4, a write request from processor unit 10 to real address RA2 is depicted by path 429, which is received by both memory controllers 34 and 44, causing each of memory modules M2 and M3 to be updated by the written data. As will be appreciated, this mechanism allows for memory coherency during the move process.

Once the memory module move process has completed, move engine 28 directs memory controller 34 to respond to memory accesses from interconnect 12 at its FROM real address in field 306 and directs memory controller 44 to respond to memory accesses from interconnect 12 at another real address within the reconfigured real memory space. In this example, memory controller 44 is reprogrammed for real address RA3 to provide contiguous real addressable memory RA1–RA3. The operating system is then notified that the real address space of the system has been increased by an amount equal to the addressable space of memory module M2. The operating system will then begin to store and access memory pages across the real address space RA1–RA3 of memory modules M1, M2, and M3.

As will be appreciated there are cases where the memory module being inserted matches the memory boundry of the existing memory and the real address space does not have to be reconfigured. Thus, in an alternative embodiment, the memory move process is not performed and the mapping engine 36 immediately programs the memory controller associated with the inserted memory module to respond to the TO real address associated with the newly added real address space. For example, if memory module M2 as shown in FIG. 4 is being added to physical memory 22, fields 306 and 308 would each be programmed with real address RA3. In this case, the data stored in memory module M3 is not copied to memory module M2 and remains in memory module M3. Once memory module M2 has been added in its memory slot within physical memory 22, the operating system is notified that its real address space has been increased by an amount equal to the memory storage of memory module M2 and memory controller 34 immediately begins to respond to memory accesses into real address RA3.

For the case of replacement of a memory module in the physical memory 22, the memory module is removed from physical memory 22 in accordance with the process described in conjunction with FIG. 3, and then a new memory module is inserted back into the physical memory in accordance with the process described in conjunction with FIG. 4. Also, with reference now back to FIG. 1, mapping engine 56 within input/output connector 52 operates in the same manner as mapping engines 36. Input/output connector 52 operates in a similar manner as processor unit 10 when performing direct memory access operations to a memory module being reconfigured in accordance with the preferred embodiment. As will be appreciated, the system may have additional input/output connectors, equal to input/output connector 52, connected to interconnect 12. As various input/output devices, such as disk drives and video monitors, are added and removed on PCI bus 58 (or other similar attached buses), mapping engine 56 would operate in conjunction with move engine 28 in the same fashion as described above with respect to the removal and addition of memory modules in physical memory 22 to allow for the virtualization of the physical addresses to such input/output devices.

As will be appreciated, the preferred embodiment provides for a memory module to be inserted, removed or replaced in physical memory 22 without the operating system having to direct and control the reconfiguration of physical memory to accomplish the physical memory change. In the preferred embodiment, move engine 28 and mapping engines 36 work in conjunction to transparently reconfigure the physical memory to accomplish the addition, subtraction, or replacement of a particular memory module in the physical memory. Each mapping engine register stores the current and new real addresses that allow the move and mapping engines to virtualize the physical address for the memory module being configured and provide the reconfiguration and manipulation of the stored data in real-time through the use of hardware functionality and not software.

While the invention has been particularly shown and described with reference to a preferred embodiment, it will be understood by those skilled in the art that various changes in form and detail may be made therein without departing from the spirit and scope of the invention.

What is claimed is:

1. A computing system coupled to a physical memory system having a plurality of memory modules for storing data as a plurality of memory blocks, each memory block comprising contiguous bytes of physical memory, and further coupled to at least one memory controller, wherein each memory controller of the at least one memory controller has one or more memory modules of the plurality of memory modules coupled thereto, and wherein each memory controller of the at least one memory controller responds to memory accesses by writing and reading memory blocks stored within one or more of the memory modules coupled thereto, the computing system comprising:

a processor device for generating memory accesses containing real addresses associated with memory locations of the physical memory system for reading and writing of data thereto;

a register within the processor device having a first field storing a first real address corresponding to a first memory module of the plurality of memory modules coupled thereto, wherein a first memory controller coupled to the first memory module is programmed to respond to memory requests addressed to the first real address, and a second field storing a second real address corresponding to a second memory module of the plurality of memory modules coupled thereto, wherein a second memory controller coupled to the second memory module is programmed to respond to memory requests addressed to the second real address;

a move engine within the processor device that, in response to a notification that a configuration of the first and second memory modules is being modified, copies the plurality of memory blocks from the first memory module to the second memory module based on the first real address and the second real address; and a mapping engine within the processor device that issues a write memory request addressed to the first real address and the second real address in response to the processor device issuing a write memory request addressed to the real address stored in one of the first field or second field during a time period that the move engine is copying the plurality of memory blocks from the first memory module to the second memory module, and that reprograms the second memory controller to respond to memory requests addressed to the first real address after the time period that the move engine is copying the plurality of memory blocks from the first memory module to the second memory module.

2. The computing system of claim 1, wherein the mapping engine issues the write memory request addressed to both the first real address and second real address in response to the processor device requesting a write memory request addressed to the first real address during a time period that the move engine is copying the plurality of memory blocks from the first memory module to the second memory module.

3. The computing system of claim 1, wherein the first memory module is removed from the physical memory system after the mapping engine enables the second memory controller to respond to memory accesses addressed to the first real address after the time period that the move engine is copying the plurality of memory blocks from the first memory module to the second memory module.

4. The method of claim 3, wherein the first real address is within the current addressable space of the physical memory system prior to the time period that the move engine is copying the plurality of memory blocks from the first memory module to the second memory module.

5. The system of claim 1, wherein the second memory module is inserted into the physical memory system before the move engine copies the plurality of memory blocks from the first memory module to the second memory module.

6. The system of claim 5, wherein the first real address is outside the current addressable space of the physical memory system address prior to the time period that the move engine is copying the plurality of memory blocks from the first memory module to the second memory module.

7. A method of data processing within a data processing system, wherein the data processing system including a processor device for generating memory accesses containing physical addresses associated with memory locations of a physical memory system for reading and writing of data thereto, the physical memory system including a plurality of memory controllers, each responding to memory accesses requested by the processor device by writing and reading memory blocks stored within one or more memory modules coupled thereto, the method comprising:

setting a register in the processor device to indicate a first real address and a second real address corresponding to a first and a second memory module, respectively, the first and second memory modules being coupled to a first and a second memory controller, respectively;

copying the plurality of memory blocks from the first memory module to the second memory module based on the first real address and the second real address;

before completing the copying step, issuing a write memory request addressed to the first real address and the second real address in response to the processor device issuing a write memory request addressed to the real address stored in one of the first field or second field; and after completing the copying step, configuring the first and second memory controllers to respond only to memory accesses addressed to the new real address.

8. The method of claim 7, wherein, during the copying step, a write memory request is issued that is addressed to the first real address and the second real address in response to the processor device issuing a write memory request addressed to the current real address.

9. The method of claim 7, further comprising the step of removing the first memory module from the physical memory system following the configuring step, and wherein the first real address is within a current addressable space for the physical memory system.

10. The method of claim 7, further comprising the step of inserting the first memory module into the memory system prior to the copying step, and wherein the second real address is outside a current addressable space for the physical memory.

11. The method of claim 7, the method further comprising notifying the processor that a configuration of the plurality of memory modules is being modified, and wherein the setting step is performed in response to the notification.

12. A data processing system comprising:

a physical memory system having a plurality of memory modules for storing data as a plurality of memory blocks, each memory block comprising contiguous bytes of physical memory;

a plurality of memory controllers, wherein each memory controller of the plurality of memory controllers has one or more memory modules of the plurality of memory modules coupled thereto, and wherein each memory controller of the plurality of memory controllers responds to memory accesses by writing and reading memory blocks stored within the one or more of the memory modules coupled thereto; and a plurality of processor devices for generating memory accesses containing real addresses associated with memory locations of the physical memory system for reading and writing of data thereto, wherein each processor device of the plurality of processor devices includes:

a register having a first field storing a first real address corresponding to a first memory module of the plurality of memory modules coupled thereto, wherein a first memory controller coupled to the first memory module is programmed to respond to memory requests addressed to the first real address, and a second field storing a second real address corresponding to a second memory module of the plurality of memory modules coupled thereto, wherein a second memory controller coupled to the second memory module is programmed to respond to memory requests addressed to the second real address;

a move engine that, in response to a notification that a configuration of the first and second memory modules is being modified, copies the plurality of memory blocks from the first memory module to the second memory module based on the first real address and the second real address; and a mapping engine that issues a write memory request addressed to the first real address and the second real address in response to the processor device requesting a write memory request addressed to the real address stored in one of the first field or second field during a time period that the move engine is copying the plurality of memory blocks from the first memory module to the second memory module, and that reprograms the second memory controller to respond to memory requests addressed to the first real address after the time period that the move engine is copying the plurality of memory blocks from the first memory module to the second memory module.

13. The system of claim 12, wherein the mapping engine issues the write memory request addressed to both the first real address and second real address in response to the processor device requesting a write memory request addressed to the first real address during a time period that the move engine is copying the plurality of memory blocks from the first memory module to the second memory module.

14. The system of claim 12, wherein the first memory module is removed from the physical memory system after the mapping engine enables the second memory controller to respond to memory accesses addressed to the second real address after the time period that the move engine is copying the plurality of memory blocks from the first memory module to the second memory module.

15. The method of claim 14, wherein the first real address is within the current addressable space of the physical memory system prior to the time period that the move engine is copying the plurality of memory blocks from the first memory module to the second memory module.

16. The system of claim 12, wherein the second memory module is inserted into the physical memory system before the move engine copies the plurality of memory blocks from the first memory module to the second memory module.

17. The system of claim 16, wherein the first real address is outside the current addressable space of the physical memory system address prior to the time period that the move engine is copying the plurality of memory blocks from the first memory module to the second memory module.

* * * * *